Patented Apr. 5, 1927.

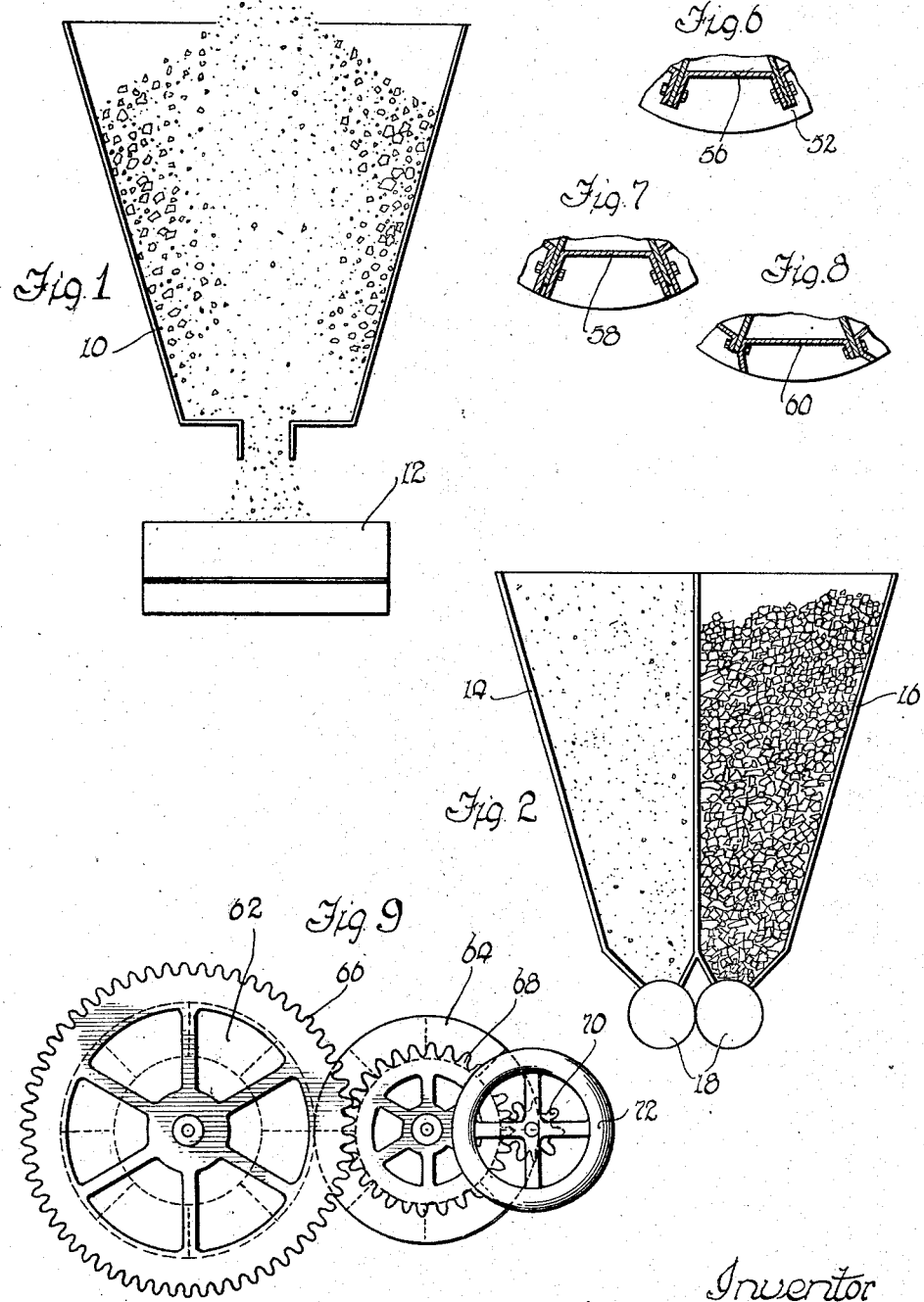

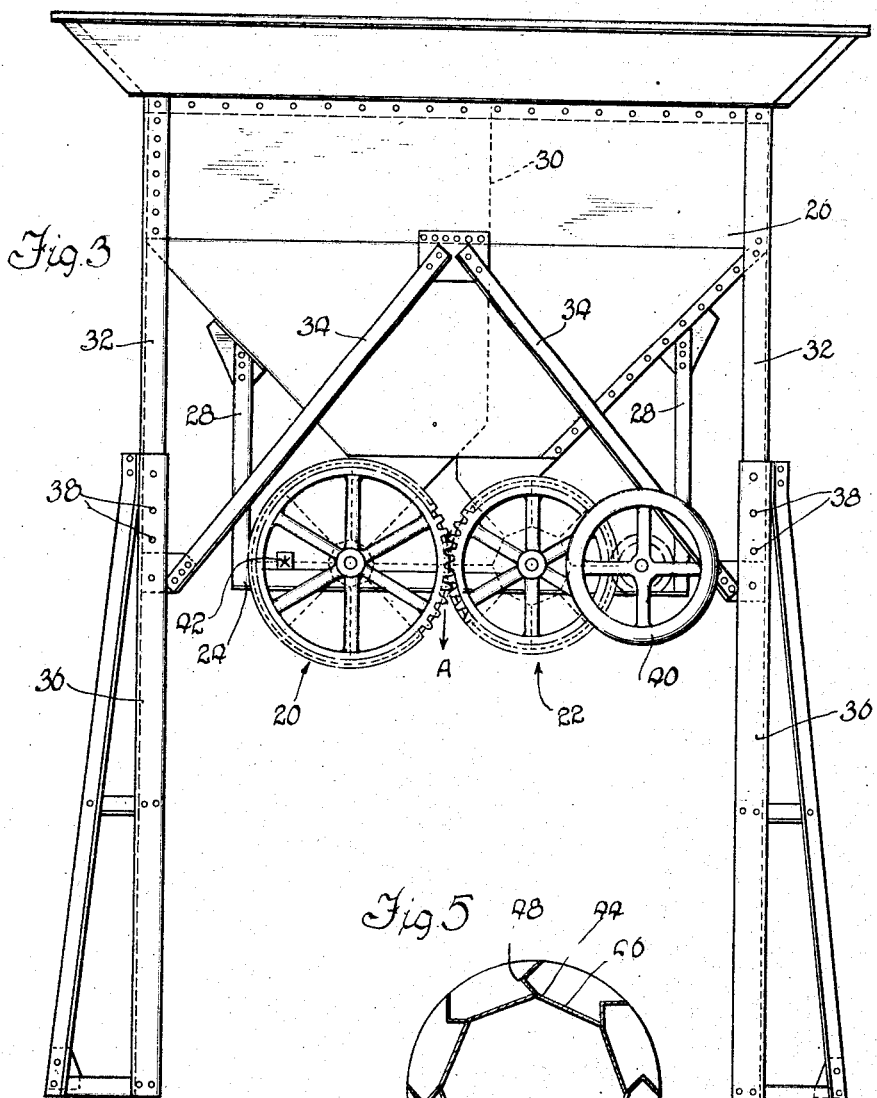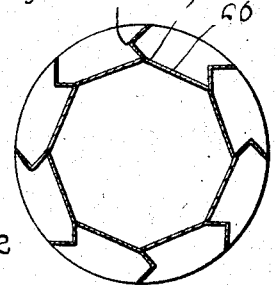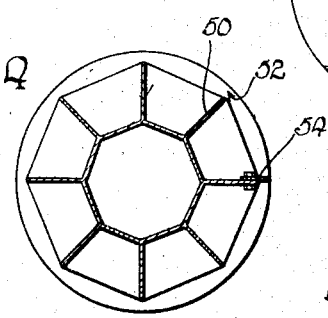

1,623,590

UNITED STATES PATENT OFFICE.

JOHN H. GUNNISON, OF MADISON, WISCONSIN.

MIXER.

Application filed July 8, 1922. Serial No. 573,710.

My invention relates to an improvement in the art of mixing and measuring material. While I am at present employing apparatus according to my invention, primarily in compounding the ingredients of aggregates for road making, it will be apparent that certain features of the invention are not limited in their application to road making, compounding aggregate, proportioning ingredients, or mixing.

One object of my invention is to provide a simple device for proportioning the ingredients of an aggregate.

Another object is to get the aggregate in place in a mixture of an intimacy compatible with the thickness of the aggregate.

Another object is to provide a proportioning device easily controlled by hand without any power devices.

Another object is to let the material handled supply the power necessary to operate the device.

Another object is to employ the proportioning device as a measuring device also.

Another object is to provide for convenient adjustment of the proportioning device to vary the proportions handled.

Another object is to handle coarse material in a movable measuring device without choking or breaking the device.

Another object is to prevent escape of material when the measuring and proportioning means is not in use.

Another object is to provide for satisfactory measuring without any attention to the measuring feature on the part of the operator.

Another object is to accomplish intimate and uniform mixture of a plurality of ingredients, without any agitation or other operation in addition to that necessarily involved in measuring the ingredients and depositing the measured quantities.

Further objects and advantages of the invention will become apparent as the description proceeds.

In the accompanying drawings:

Figure 1 is a diagram used in explaining how the segregation avoided by my invention usually occurs;

Fig. 2 is a similar diagram used in explaining the operation of my invention;

Fig. 3 is an end elevation of an apparatus constructed according to my invention;

Figs. 4 and 5 are transverse sections through the stone and sand measuring drums of the apparatus shown in Fig. 3;

Figs. 6, 7 and 8 show different ways of varying the capacity of the buckets of the drum; and, Fig. 9 is a detail end view of a modification.

Referring first to Figure 1, when a mixture containing pieces of material of different sizes is dumped into any container 10, regardless of the shape of the container, more or less segregation will occur. At the point where the material falls, the fines will concentrate, and the coarser particles will roll down the slope to the walls of the container. This is indicated in a rather rough diagrammatic way by the distribution of the particles of various sizes in the container 10. When such a container is emptied into a smaller container 12, of such size that several of the small containers will be filled by the large container, the usual process of mixing the aggregate, pouring into a large container 10, and filling small containers 12, which may be wagon boxes or wheel barrows, from the large container 10, automatically assures delivery first of several small containers 12 full of fine material and then of several small containers 12 full of coarse material.

In making gravel or stone roads, it has been found that an aggregate of sufficient density will compact in service into a hard stony mass forming a fairly good water shed and not easily gutted by heavy rains. If, however, there are spots where all the particles are all small or coarse, so that the density of the aggregate is low, the traffic will merely churn up the material and form deep ruts in it, and heavy rains will soon wash it away.

Unless road building according to the method outlined in connection with Figure 1 is practiced under the constant and detailed supervision of an unusually competent and conscientious man, washed out roads will be the rule rather than the exception.

According to my invention, the mixing of the fine and coarse materials is postponed to a later stage in the handling of the material, so as to avoid segregation. Referring to Figure 2 the fines are placed in a bin 14 and the coarse material in a bin 16. Distributing means indicated at 18 take material from each of these bins in the proper proportion and deposit it in an intimate and uniform mixture in any receptacle positioned below. In road building this receptacle will be a wagon box or wheel barrow, from which the material is dumped directly on the road, the movement of the material in dumping being of such a different character from the pouring movement employed to fill the receptacle, that whatever segregation has occurred in filling the receptacle will be eliminated. Even if this were not so, the area covered by a single wheel barrow or wagon box full of material is small enough so that the smoothing and distributing done after depositing the material would effectively eliminate any segregation if it had occurred.

Referring now to the embodiments of apparatus according to my invention selected for illustration in Figures 3 to 8, two measuring drums 20 and 22 are geared together by gears of equal size to rotate so that their adjacent faces move downward together as indicated by arrow A. The drums themselves may be of the same or different diameter. In Figure 3, 20 is the gravel or stone drum and 22 the sand or fines drum, and drum 20 is of slightly greater diameter than drum 22. This facilitates making the buckets in drum 20 of a larger capacity than those in drum 22.

The drums are supported on a suitable framework 24, which framework is in turn suspended from a container of any desired size or shape 26, as by means of risers 28. A partition 30 divides the container 26 into two parts, the part arranged to receive gravel or stone being preferably considerably larger than that receiving sand.

To make a unit that can be easily carried from place to place and quickly set up, I prolong the corner posts 32, reinforcing them by braces 34 to a trifle below the level of framework 24. Truss legs 36 are provided, which may be detachably fastened to corner posts 32, at 38 when the device is set up. These legs will be made long enough, in case the batcher is designed to fill a wagon box, to hold framework 24 well above the level of the box on an ordinary wagon or truck, which may be driven between legs 36 under the drums to receive its load. When a particular piece of work is finished, it is a relatively simple matter to run a truck with a dumping body under framework 24, raise the body enough to lift legs 36 off the ground, detach legs 36 and drive on with the rest of the outfit to the next job.

Meshing with the gear carried by the drum 22 is a pinion keyed to the same shaft as hand-wheel 40. The weight of the material moving through drums 20 and 22 is ordinarily more than sufficient to overcome frictional resistance, so that the operator merely holds back a little on hand wheel 40 to keep the drum from running too fast.

A suitable counting device 42 may be positioned to record the revolutions of either one of the drums, this being all that is necessary to provide an accurate record of the amount of material handled. Such a record is not infrequently the basis of payment for the work performed, and it is undesirable to have it kept by making entries with paper and pencil by any individual. In the absence of actual fraud by turning the drums when there is no material in the bin above them, or tampering with the revolution counter 42, an unquestionable record of the exact amount of material is provided without attention on the part of anyone. The operator controlling hand wheel 40 merely uses it to start and stop the drum so as to properly fill the wagon driven under the same, and need not give attention to anything else.

One successful sand drum I have used is illustrated in Figure 5, and comprises a series of plates 44, each comprising a main portion 46 forming one side of a polygon completely bounded by such main portions, and a V-shaped side portion 48, defining one side of the bucket, the other side being defined by the corresponding portion of the next plate.

The gravel or stone handled by the device, frequently contains pebbles of a diameter as large as 2 inches. It has heretofore, so far as I am aware, been considered impossible to handle material of such large size in a rotary measuring drum. I have accomplished this; first, by cutting the vanes 50 defining the bucket of the stone drum 20 so that their edges have a clearance indicated at 52 in Figure 4 substantially equal to the diameter of the largest pebble in the stone handled. Such a measuring drum operates in a very satisfactory way as far as measuring is concerned, and is also kept in service without unnecessary repairs or replacements.

When such a drum is not rotating, there is a tendency for some of the smaller particles of material to continue leaking out past the edge of the vane 50. This difficulty is overcome without eliminating the advantages of clearance at 52 by fastening a flexible leaf 54, such as a 4-inch strip of old leather belting to one vane, and stopping the drum where such a vane operates to seal the opening in the bin. Obviously, a plurality of such flexible leaves might be provided, but it has been found that the conditions of service are ordinarily such that one is sufficient.

As the opposing buckets move toward each other from their highest position to the level of the pivotal axes of the drums, their leading walls form a barrier until the level of the drum axes is past, after which a central slot opens slowly, through which the coarse and fine material pours in a rather intimate stream. This stream falls a considerable distance before it strikes the accumulating pile of material below, and during its fall, and by the scattering of impact on the pile is thoroughly and uniformly mixed.

Suitable inserts are preferably provided for changing the size of bucket in the drum, to vary the proportion of the ingredients delivered thereby. In Figure 6 I have illustrated insert 56 adapted to be bolted in place to cut down the bucket of a stone drum without eliminating clearance at 52. In Figure 7 a generally similar insert 58 converts the stone drum into a sand drum; and in Figure 8 insert 60 provides a shape of bucket very similar to that shown in Figure 5.

While a very great disparity in surface speed might be objectionable, it is not essential that the two drums should be driven either at the same surface speed or at the same speed of rotation. In Figure 9 I have illustrated a sand drum 62 and a stone drum 64, the drums being of equal dimensions, but being driven at different speeds by gears 66 and 68, and controlled by the usual pinion 70 and hand wheel 72.

By the expression "building material" or "aggregate for building material" it is my intention to include road building and analogous arts as well as construction in which cement is employed with the aggregate, and to exclude the handling of coffee, grain, and other materials of less structural strength or hardness than ordinary metal.

Without further elaboration, the foregoing will so fully explain the gist of my invention, that others may, by applying current knowledge, readily adapt the same for use under various conditions of service. It will, for instance, be obvious that either drum can be used alone simply as a measuring device, and that by proper positioning and adjustment of flexible leaf 54, a stone drum may be employed satisfactorily to handle various aggregates, or sized material considerably smaller than the largest it is capable of handling. Many modifications and alterations may be made without eliminating certain features which may properly be said to constitute the essential items of novelty involved, which items are intended to be defined and secured to me in the following claims.

I claim:—

1. Measuring means comprising a container having a wall and a bottom opening, a drum covering said bottom opening and operable adjacent the edge of said wall, said drum receiving material directly from the container, walls defining buckets in said drum, said walls being cut away to provide a clearance between them and the edge of said container wall, and yieldable extension means carried by the drum and cooperable with said container wall to seal the clearance between it and the bucket wall.

2. Measuring means comprising a container having enclosing walls and a bottom opening, a drum covering said opening and rotatable adjacent the edge of said enclosing walls adjacent said opening, said drum receiving material directly from the container, walls defining buckets in said drum, said walls being spaced from the edge of the far wall of the container in the rotation of the drum walls there past, and a yieldable flap carried by one of the drum walls and cooperable with said far wall of the container to seal the clearance between it and the drum wall.

3. In a measurer for aggregates for building material, in combination, a container, a bucket drum to discharge material from said container, said drum being actuated by the weight of the material handled, a manual control element, and speed reduction gearing between said element and said drum.

In witness whereof, I hereunto subscribe my name this 29th day of June, 1922.

JOHN H. GUNNISON.